Figure 1:
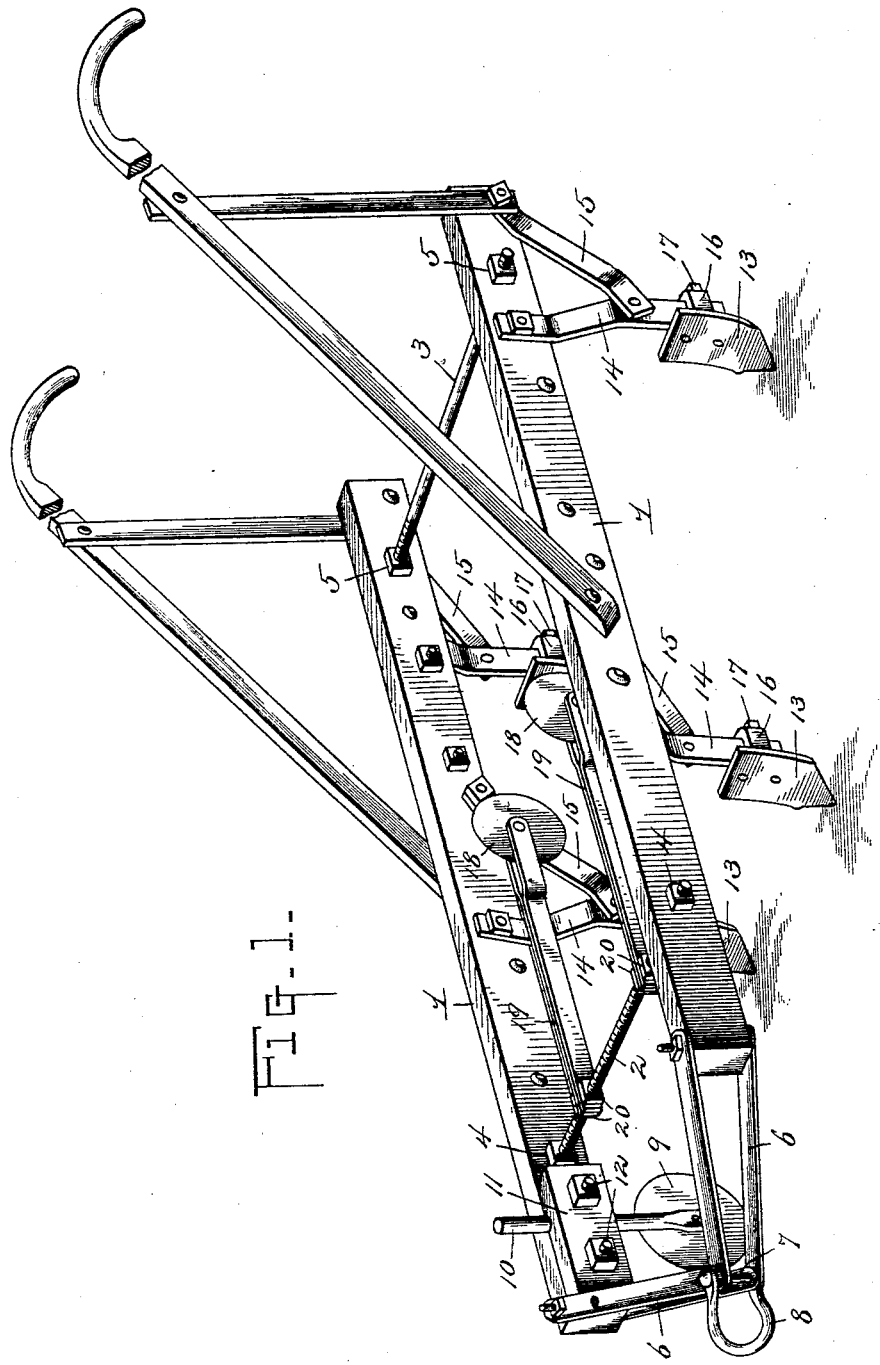

(No Model.) 2 Sheets—Sheet 1.

W. T. CALTON.
CULTIVATOR.

No. 580,250. Patented Apr. 6, 1897.

Witnesses
Harry L. Amer
V. B. Hillyard

Inventor
William T. Calton.

By his Attorneys,
C. A. Snow & Co.

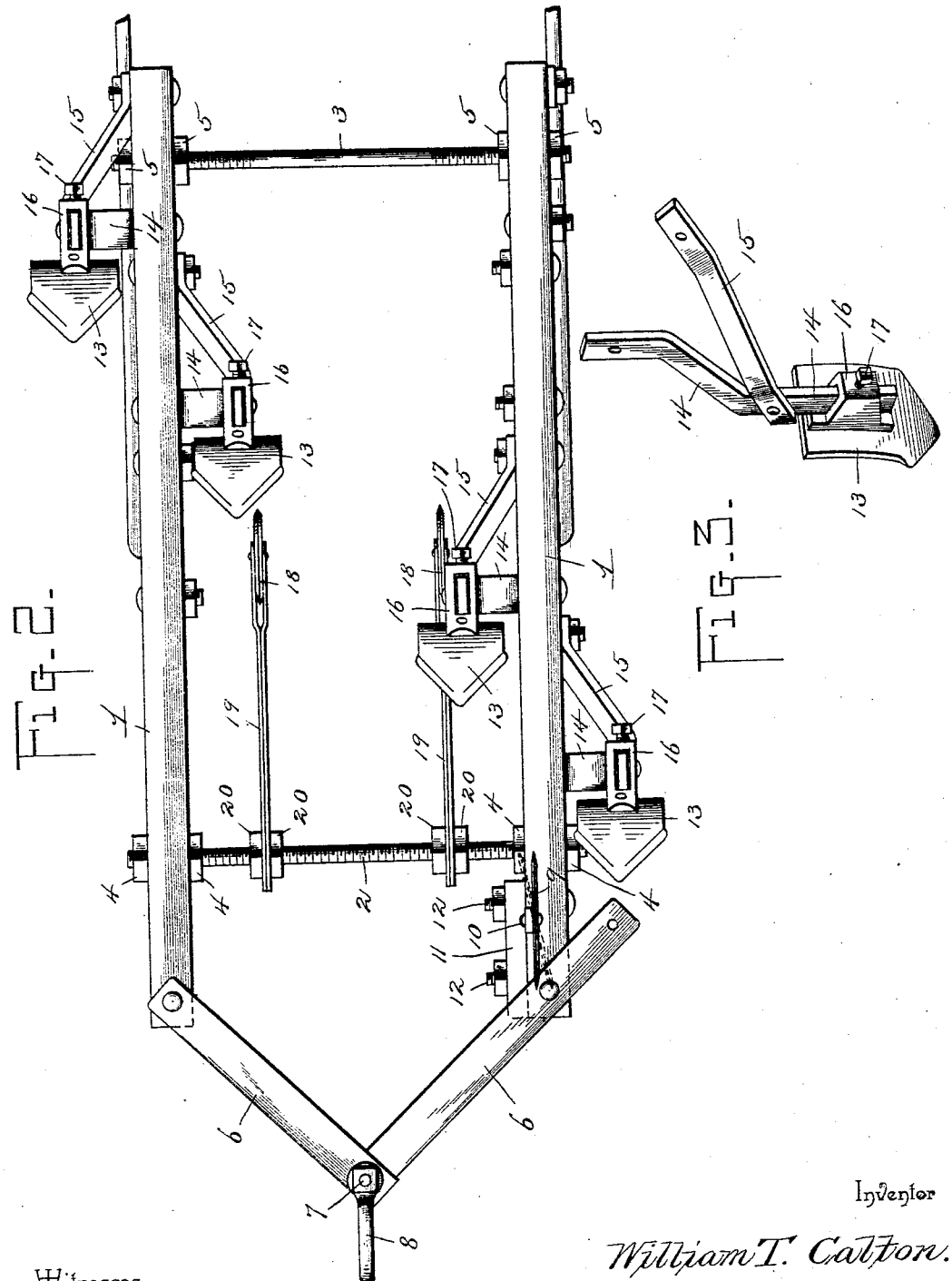

UNITED STATES PATENT OFFICE.

WILLIAM T. CALTON, OF LATTIMORE, NORTH CAROLINA.

CULTIVATOR.

SPECIFICATION forming part of Letters Patent No. 580,250, dated April 6, 1897.

Application filed June 23, 1896. Serial No. 596,648. (No model.)

*To all whom it may concern:*

Be it known that I, WILLIAM T. CALTON, a citizen of the United States, residing at Lattimore, in the county of Cleveland and State of North Carolina, have invented a new and useful Cultivator, of which the following is a specification.

This invention relates to that class of agricultural implements designed for cultivating purposes and aims to provide a machine of this character which can be drawn over the field by a single horse, the latter walking between the rows, while the cultivator runs on top of the row and simultaneously cultivates the plants on both sides, the side draft being counteracted or compensated for by means of a disk cutter which is capable of being adjusted to any height or angle to meet the existing conditions.

A further object of the invention is to construct an implement which is capable of having its parts interchanged and shifted so as to provide a cultivator to run on the top or side of a row or for any purpose found expedient to perform the work in hand in a rapid, convenient, expeditious, and satisfactory manner.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a cultivator specially designed for effecting the objects of this invention, the parts being disposed to adapt the implement for running on top of a row. Fig. 2 is a plan view of the cultivator inverted, showing the shovels arranged about in the position which they will occupy when the implement is adapted for cultivating the side of a row. Fig. 3 is a detail view of a shovel, its standard, and the brace for the latter.

Corresponding and like parts are referred to in the following description and indicated in the several views of the accompanying drawings by the same reference-characters.

The implement comprises longitudinal beams 1, to which the standards bearing the cultivator-shovels are attached, and connecting-rods 2 and 3. The front connecting-rod 2 is threaded throughout its length and passes through corresponding openings in the beams 1 and is provided near each end with a pair of nuts 4, between which the beams are held. The rear connecting-rod 3 is similar in construction to the front connecting-rod 2, with the exception that its middle portion is devoid of threads, as the latter are not necessary, as will presently appear. A pair of nuts 5 are provided for each end of the connecting-rod 3 to hold the longitudinal beams in a relatively-adjusted position.

Draft rods or bars 6 have pivotal connection at their rear ends with the front terminals of the longitudinal beams 1 and incline and overlap at their front ends and receive a bolt 7, by means of which the clevis 8 is connected to the overlapping ends of the draft-bars 6. The draft bars or rods are provided in pairs, and each pair embraces the respective beam between its rear ends. One set of draft bars or rods is made longer than the other, thereby enabling the clevis 8 to occupy a position to one side of the longitudinal center of the implement, so that the horse may walk to one side of the row being cultivated. When the implement is adjusted as a side-row cultivator, as shown in Fig. 2, the draft-bars are positioned so that the clevis 8 will be in line with the longitudinal center of the machine.

When the implement is adapted and arranged for use as a top-row cultivator, as shown in Fig. 1, provision is had for counteracting the side draft in a disk cutter 9, which is located near the front end of the longitudinal beam to which the longer draft bar or rod is attached. The shank 10, bearing the disk cutter 9, is round at its upper end and is clamped between a block 11 and a side of the said longitudinal beam, both the block and beam being grooved so as to provide an opening for the reception of the shank. By loosening the bolts 12, employed for securing the block in place, the shank 10 can be moved vertically or turned so as to change the elevation of the disk cutter or its inclination with respect to the line of motion of the implement. The inclination of the disk cutter to the line of draft must be such as to compensate for the side draft incident to locating the clevis 8 to one side of the longitudinal center of the machine.

The cultivator-shovels 13 may be of any desired configuration and style best adapted to the work to be performed, and the standards 14 have an offset intermediate of their ends, so as to throw the shovels to one side or the other of the beams. Each standard is strengthened by a brace 15, which is connected at its lower end to the standard and at its upper end to the beam. A cast-metal block 16 is secured to the rear side of each shovel and is vertically apertured for the passage therethrough of the lower end of the standard, a binding-screw 17 entering a threaded opening in the block and having its inner end constructed to bear laterally against a side or edge of the standard, so as to hold the shovel at the required elevation. By this means provision is had for regulating the depth of cultivation, since the shovels can be raised or lowered at will.

The position of the standards and shovels will depend upon the character of work to be performed. For top-row cultivating the standards will be secured to opposite sides of the longitudinal beams and corresponding standards will be in transverse alinement, as shown in Fig. 1, but when the implement is arranged for side-row cultivating the position of the standards will be changed so that the shovels will range diagonally about in a straight line from one corner of the frame to the diagonally opposite corner, as shown most clearly in Fig. 2. The standards and their braces are removably attached to the longitudinal beams by bolts, so that they may be interchanged and shifted as may be required.

In order to prevent injury to the young plants, rotary fenders 18 are provided and journaled in the free ends of arms 19, which latter are mounted upon and carried by the front connecting-rod 2, the arms being adjustable upon the said rod and held in an adjusted position by being clamped between pairs of nuts 20, mounted upon the said rod 2. By loosening a nut of each pair the arms 19 can be turned so as to properly position the fenders, so as to afford the best protection possible to the plants during the cultivating process. When the fenders are not required for use, they can be turned up out of the way by first loosening one or the other of the pair of nuts 20, and will be held in the elevated position by retightening the nuts, so as to clamp the arms between them.

Having thus described the invention, what is claimed as new is—

1. In a cultivator, the combination of beams bearing cultivating devices, a clevis applied to one side of the longitudinal center of the cultivator, and a disk cutter located at the side of the cultivator remote from the clevis and constructed to be arranged at an angle to the line of travel of the implement so as to compensate for side draft, substantially as set forth.

2. In a cultivator, the combination of longitudinal beams bearing cultivating devices, rods adjustably connecting the beams, and fenders adjustably mounted upon one of the connecting-rods and movable between the longitudinal beams, substantially as and for the purpose set forth.

3. In a cultivator, the combination of longitudinal beams bearing cultivating devices, threaded rods provided with pairs of nuts for adjustably connecting the longitudinal beams, arms bearing fenders and adjustable upon one of the connecting-rods, and a pair of nuts for securing each arm upon its supporting-rod in the required position, substantially as set forth.

In testimony that I claim the foregoing as my own I have hereto affixed my signature in the presence of two witnesses.

WILLIAM T. CALTON.

Witnesses:
L. V. LEE,
J. D. CALTON.